United States Patent
Länger-Möller et al.

(10) Patent No.: US 12,253,065 B2
(45) Date of Patent: Mar. 18, 2025

(54) METHOD FOR CONTROLLING A WIND POWER INSTALLATION SO AS TO PROTECT BIRDS AND BATS

(71) Applicant: Wobben Properties GmbH, Aurich (DE)

(72) Inventors: Annika Länger-Möller, Aurich (DE); Fabian Lorenz, Magdeburg (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 18/339,692

(22) Filed: Jun. 22, 2023

(65) Prior Publication Data

US 2023/0417223 A1    Dec. 28, 2023

(30) Foreign Application Priority Data

Jun. 23, 2022    (EP) .................................. 22180715

(51) Int. Cl.
*F03D 7/02*    (2006.01)
*F03D 80/00*    (2016.01)

(52) U.S. Cl.
CPC ......... *F03D 80/004* (2023.08); *F03D 7/0276* (2013.01); *F05B 2270/30* (2013.01)

(58) Field of Classification Search
CPC .. F03D 80/004; F03D 7/0276; F05B 2270/30; Y02E 10/72
See application file for complete search history.

(56) References Cited

U.S. PATENT DOCUMENTS 9,581,165 B2 *   2/2017   Babbitt ................... F03D 80/00
2008/0260531 A1 * 10/2008   Stommel .................. F03D 7/02
                                                119/718

(Continued)

FOREIGN PATENT DOCUMENTS

DE    102018102106 A1 *   8/2019
DE    10 2019 000719 A1   10/2019

(Continued)

*Primary Examiner* — David E Sosnowski
*Assistant Examiner* — Wayne A Lambert
(74) *Attorney, Agent, or Firm* — Seed IP Law Group LLP

(57) ABSTRACT

The invention relates to a method for controlling a wind power installation which has a rotor having rotor blades that are adjustable in terms of their blade angle, and having a rotor diameter, wherein the rotor is able to be operated at a variable rotor rotating speed; and a region in which the rotor blades move forms a danger zone for birds and bats, the method comprising the following steps: checking whether a bird or bat approaching the wind power installation is an endangered bird and if an endangered bird has been identified, detecting a bird position as the current position of the endangered bird identified; and controlling the rotor rotating speed as a function of the bird position in relation to the wind power installation; wherein the rotor rotating speed is reduced in multiple stages or continuously as the distance of the bird position from the wind power installation decreases. The invention is intended to propose a solution in which a wind power installation poses the lowest possible risk to endangered species of birds and bats while at the same time offering the best possible yield. The intention is to at least propose an alternative to the solutions known to date.

16 Claims, 3 Drawing Sheets

(56) References Cited

U.S. PATENT DOCUMENTS

| | | | | |
|---|---|---|---|---|
| 2008/0298962 A1* | 12/2008 | Sliwa | .................... | F03D 80/00 |
| | | | | 416/223 R |
| 2009/0185900 A1* | 7/2009 | Hirakata | ................ | F03D 17/00 |
| | | | | 416/31 |
| 2012/0136495 A1* | 5/2012 | Lagrange | ........... | G05B 19/4061 |
| | | | | 700/287 |
| 2012/0251317 A1* | 10/2012 | Reitmaier | ............... | F03D 80/00 |
| | | | | 416/61 |
| 2013/0050400 A1* | 2/2013 | Stiesdal | ................ | F03D 80/00 |
| | | | | 348/36 |
| 2013/0052010 A1* | 2/2013 | Nielsen | .................. | F03D 80/10 |
| | | | | 416/1 |
| 2016/0055399 A1* | 2/2016 | Hiester | .................. | F03D 7/048 |
| | | | | 382/110 |
| 2016/0055400 A1* | 2/2016 | Jorquera | ................ | F03D 17/00 |
| | | | | 416/61 |
| 2021/0332793 A1* | 10/2021 | Ou | ....................... | F03D 7/0276 |

FOREIGN PATENT DOCUMENTS

| | | |
|---|---|---|
| DE | 10 2019 220281 B3 | 1/2021 |
| EP | 2 017 470 A1 | 1/2009 |
| EP | 2 673 502 B1 | 4/2016 |
| EP | 2 721 292 B1 | 7/2017 |
| EP | 3 123 025 B1 | 3/2018 |
| EP | 3 183 687 B1 | 7/2020 |
| EP | 4 012 175 A1 | 6/2022 |
| JP | 2016217252 A * | 12/2016 |
| JP | 6856964 B1 * | 4/2021 |

\* cited by examiner

METHOD FOR CONTROLLING A WIND POWER INSTALLATION SO AS TO PROTECT BIRDS AND BATS

BACKGROUND

Technical Field

The present invention relates to a method for controlling a wind power installation and to a corresponding wind power installation.

Description of the Related Art

Wind power installations have a rotor having a plurality of rotor blades. In order to generate electric power from wind, such a rotor is set in rotating motion by the wind. Owing to the large dimensions of such a rotor, the latter often having diameters of more than 100 meters, in many instances even more than 150 meters, speeds in the range of up to 300 km/h (kilometers/hour) can arise at the outer periphery of the rotor, thus at the tips of the rotor blades.

Such high speeds can pose a risk to birds and bats because even birds that fly at high speeds can no longer correctly estimate such high speeds and can therefore be injured or even clobbered to death by a rotor blade moving at such a fast speed.

It is particularly problematic when wind power installations are to be erected and operated in the region of the habitat of endangered bird or bat species. If no solution for protecting such endangered species is found, the point at which the erection of a wind power installation is completely prohibited may be reached.

Ultimately however, wind power installations for reasons known are environmentally friendly in comparison to conventional power stations, and it should therefore be ideally attempted to also erect a wind power installation by protecting endangered species in other ways.

One possibility of protecting endangered species lies in operating the wind power installation erected in the proximity of a habitat of endangered species only when the endangered animals are not close by.

Bats are known not to fly in inclement conditions (too cold, too much rain, too windy, or too bright) so that the wind power installation can be operated at those times without causing a risk to the bats.

For birds, systems which can automatically recognize whether an animal comes too close to the wind power installation have become available in the meantime, said systems also being applicable to bats. Such systems are even capable of identifying the animals flying into a region in proximity of the wind power installation according to their species.

In this way it is possible for an animal flying in proximity of the wind power installation to be identified and for the wind power installation to be stopped depending on said identification before the animal can reach the wind power installation. Such systems function quite well but nevertheless often lead to unnecessary shutdowns because most of the animals approaching the wind power installation to within a specific distance do not actually continue to ultimately fly towards the wind power installation. However, stopping the wind power installation is correct and important for those animals that actually do fly towards the wind power installation. In all other cases, however, this results in an unnecessary loss of yield.

The prior art is mirrored in documents DE 10 2019 220 281 B3, EP 3 123 025 B1 and EP 2 673 502 B1.

BRIEF SUMMARY

Provided are techniques in which a wind power installation poses the lowest possible risk to endangered species of birds and bats while at the same time offering the best possible yield. The intention is to at least propose an alternative to the solutions known to date.

Proposed is a method for controlling a wind power installation which has a rotor having rotor blades that are adjustable in terms of their blade angles, and having a rotor diameter. The rotor, and thus the entire wind power installation, is able to be operated at a variable rotor rotating speed. A region in which the rotor blades move forms a danger zone for birds and bats. Proceeding therefrom, the method operates according to the following steps.

In one step, it is checked whether a bird or bat approaching the wind power installation is an endangered bird. For the sake of simplicity, birds and bats hereunder are thus referred to as birds, and when one of these animals approaches the wind power installation, specifically in flight, said animal is referred to as an endangered bird. For the sake of simplicity, a bat approaching the wind power installation hereunder is thus also referred to as an endangered bird. It is known, of course, that a bat is not a bird; however in terms of the solutions proposed here it has been recognized that the latter can also be applied to bats. If any particularities have to be taken into account, this is explicitly pointed out.

A further step, if an endangered bird has been detected, lies in detecting a bird position as the current position of the endangered bird identified. This is in particular a matter of the distance of the respective endangered bird, but further items of information, such as the specific direction from which the endangered bird has approached the wind power installation, may also be considered. The current height of the endangered bird at that moment may also be a further item of information pertaining to the bird position.

Proposed in the next step is controlling the rotor rotating speed as a function of the bird position in relation to the wind power installation. The rotor rotating speed here is reduced in multiple stages or continuously as the distance of the bird position from the wind power installation decreases.

The exact distance of the bird position, thus the distance of the endangered bird from the wind power installation, is thus taken into account and the rotor rotating speed is reduced as a function thereof, specifically reduced even more heavily the closer the endangered bird is to the wind power installation.

For visualization, the rotor rotating speed can be, for example, the slower the closer the endangered bird is to the wind power installation. However, this is but one example, and there need not be any proportional, thus linear, correlation between the distance and the rotor rotating speed, and various other criteria may also be taken into account, as will yet be explained hereunder.

It is ideally provided in principle that the rotor rotating speed is continuously controlled as a function of the distance of the bird position; however, a reduction in stages can also be considered. In this way, ten distances can be defined, for example, a pre-definable rotor rotating speed to be set for each of the latter. Such a reduction of the rotor rotating speed, or any other reduction, in multiple stages is very similar to a continuous reduction, because the reduction of the rotating speed in fact often takes place continuously even in a staged reduction, because a rotating speed cannot be varied abruptly. However, a target rotating speed can be varied abruptly.

This is based in particular on the concept that the wind power installation requires a certain amount of time in order for the rotating speed of the latter to be reduced to zero or at least to a rotating speed posing no risk to the endangered bird. The wind power installation can continue to be operated normally as long as the endangered bird is so far away from the wind power installation that the former cannot reach the wind power installation in this time. However, if the endangered bird comes too close to the wind power installation, the rotating speed can correspondingly be reduced to zero or to a low rotating speed that does not pose a risk to the bird.

It has, however, been recognized that the endangered bird does not fly onwards in the direction of the wind power installation once said endangered bird has undershot such a first critical distance from the wind power installation. For example, if the bird turns back or flies onwards in another direction, it is sufficient for the rotor rotating speed to be only slightly reduced.

This is based in particular on the concept that a reduction to such a rotating speed from which the rotating speed could be reduced further to zero, or the innocuous rotating speed, in the time the bird would take if flying further in the direction of the wind power installation is expedient. The closer the endangered bird is to the wind power installation, the less time said bird would take to reach the wind power installation. Accordingly, the wind power installation has less time for reducing the rotor rotating speed to zero, or the innocuous rotating speed. In this context, the rotor rotating speed is adapted to the bird position. The closer the endangered bird is to the wind power installation, the lower the rotor rotating speed so that the latter could still be reduced to zero or the innocuous rotating speed before the endangered bird reaches the wind power installation.

According to one aspect it is proposed that the bird species or another category of the endangered bird is identified. In this way, the bird is identified on a species level in particular so as to protect in a targeted manner endangered and heavily or particularly protected species. In the case of a bat this of course also includes that at least the classification as a bat is performed and the species is determined as far as possible. However, a classification in other categories such as sizes, such as small, medium and large, for example, can also be considered.

It is furthermore proposed that a response region about the wind power installation is established as a function of the identified bird species, wherein the response region has a regional periphery and the response region is defined in that the wind power installation can reduce the rotor rotating speed to a coasting rotating speed, a protective rotating speed, or to zero, before it is to be anticipated that the endangered bird of the bird species identified reaches the danger zone from the periphery of the response region. It is furthermore proposed that the rotor rotating speed is reduced as soon as the endangered bird flies into the response region, and the rotor rotating speed is reduced further the closer the endangered bird gets to the danger zone, without the wind power installation being shut down or stopped.

If the endangered bird is thus outside the response region, the wind power installation can be operated in an entirely normal manner. However, if the endangered bird reaches the regional periphery from the outside, the protective control becomes active and reduces the rotor rotating speed as the proximity of the endangered bird to the danger zone increases.

The response region, and thus particularly the regional periphery thereof, is of a size such that the respective bird species identified cannot reach the danger zone before the rotor rotating speed has been lowered to the innocuous rotating speed when the endangered bird is outside the response region, thus is at least at the distance of the regional periphery from the danger zone. It has however been recognized here that the wind power installation requires a certain time in order to correspondingly reduce the rotor rotating speed, but an endangered bird, depending on the species, may fly a variable distance in this time. The response region is adapted thereto.

It also has to be considered that the danger zone does not necessarily have to be a circle in a horizontal plane, but particularly defines the region in which the rotor blades move. In a plan view from above, this may be a region which transversely to the rotor axis is somewhat larger than the rotor diameter but is significantly shorter in the longitudinal axis of the rotor.

In any case however, the response region is selected to be larger the faster an endangered bird of the bird species identified can fly.

If the bird flies into the response region, the rotor rotating speed is reduced but not automatically to zero or an innocuous rotating speed, but only to the extent as is required by virtue of the remaining distance of the endangered bird from the danger zone.

To this extent, a rotor rotating speed with the value of zero is an innocuous rotating speed. A coasting rotating speed can likewise be an innocuous rotating speed. A coasting rotating speed is a rotating speed which the wind power installation can assume during a coasting operation, a coasting operation being an operation in which the rotor blades in terms of their blade angle have each been set so that they display a coasting blade angle. Such a coasting blade angle can be in the range of 60°. At such a coasting angle the rotor blades are turned out of the wind to the extent that said rotor blades no longer function as an aerodynamic profile in the wind, in which profile a laminar wind flow as substantially laminar flow streams along a suction side and along a pressure side of the rotor blade and correspondingly exerts a force of suction or pressure, respectively. Nevertheless, the wind can in particular exert a partial force of pressure on the rotor blades, which leads to a slight movement, specifically a rotation, of the rotor.

A coasting rotating speed is usually in the range from 1 to 3 revolutions per minute.

A protective rotating speed can likewise be provided, which defines a rotating speed in which the specific rotor does not represent a risk to the endangered bird. Such a protective rotating speed can in particular depend on the size of the rotor, thus the rotor diameter or the blade length, respectively, since the length of a rotor blade increases the higher the circumferential speed at the blade tip of said rotor blade. The protective rotating speed is preferably predefined as a function of the bird species identified.

According to one aspect it is proposed that a number of birds or bats approaching the wind power installation is identified as the number of endangered birds, and the controlling of the wind power installation, in particular the controlling of the rotor rotating speed, is carried out as a function of the number of endangered birds identified.

It has been recognized here that many birds display a flock behavior and a behavior can be derived therefrom. It is also to be considered that a higher risk can be accepted in the case of only a few endangered birds so that a reduction of the rotating speed is carried out later or not at all, in the case of a few birds, optionally depending on the bird species. It is preferably proposed that controlling of the wind power installation is carried out as a function of the identified number of endangered birds, in a manner corresponding to the aspects as have been proposed in the context of the controlling as a function of the bird species identified or another category.

In this way, classification of an identified number of endangered birds into a category small, medium or large can be performed, and controlling of the rotating speed can be carried out as a function thereof.

In this way, the identified number of endangered birds, which may synonymously be referred to as the number of birds, can also be a trigger criterion. It is proposed that a plurality of targets, thus a plurality of birds, are observed in parallel. It is proposed here that controlling relates in particular to triggering a stop for the individual situated closest to the installation, or to the individual with the highest probability of a collision. Speed and direction of flight and further criteria can form the basis here too. It is preferably considered that a reduction or a shutdown is provided in the case of flocks of 5 or more animals within a perimeter of a predefined distance from the wind power installation from the site of the wind power installation.

According to one aspect it is proposed that the rotor rotating speed is predefined according to a rotating speed/distance function, wherein the rotating speed/distance function defines a rotating speed as a function of a distance of the endangered bird from the danger zone. This is thus the distance between the bird position and the danger zone. The respective rotating speed to be set can thus be fixedly predefined by the rotating speed/distance function, as a function of the distance of the endangered bird from the danger zone. Only the bird position has to be determined for the purpose of implementation, the distance of the endangered bird from the danger zone then being able to be determined from said bird position. Based on this distance thus ascertained, an associated rotating speed to be set, specifically the rotor rotating speed, can then be read from the rotating speed/distance function. The rotor rotating speed to be anticipated is fixedly predefined as a result, and a method which is readily reproducible is available as a result.

Moreover, or alternatively, it is proposed that the rotor rotating speed and/or the rotating speed/distance function is set or selected as a function of a season and/or a time of day and/or of the bird species identified.

As a result, special behaviors of the respective endangered bird can be taken into account. It has been recognized in particular that birds behave differently during the breeding season than outside the breeding season. In the breeding season, a difference has to be made in particular between the time of nest construction, the time of actually hatching the eggs, and the time of raising the hatched chicks. The general breeding season firstly differs from other seasons in that the birds remain in the proximity of the nest, or the nest to be constructed, respectively. During the construction of the nest, there is a high level of activity for producing construction material, which may lead to a behavior different from that during hatching when one bird in most instances does not leave the nest while the other seeks food for itself or its partner. A high level of activity in relation to searching for food for raising the chicks occurs once the chicks have hatched.

Accordingly, the time of day may also play a part, because in most instances a different search for food takes place at different times of the day. For example, insects tend to fly less at noon time, said insects being the nutrition of the endangered bird. Many birds, particularly vultures and large birds of prey, utilize thermals for flying so that the behavior of said birds in a strong thermal, thus in particular at noon heat, differs from that in the morning hours, for example.

Accordingly, the behavior of the birds also depends on their species, thus the bird species, as has already been highlighted in the context of the example of the birds that exploit large thermals for flying.

It is correspondingly proposed that the rotor rotating speed is adapted thereto, because the different behavior of the birds depending on the season, the time of day and/or the bird species also leads to a different potential behavior of the respective bird when approaching the wind power installation, thus the danger zone.

According to one aspect, it is proposed that the rotor rotating speed is increased again when the endangered bird removes itself from the danger zone and is still situated in the response region.

It has been recognized in particular here that an increase of the rotor rotating speed does not need to be delayed until the endangered bird has completely left the response region. The way in which the rotor rotating speed has been reduced as the distance of the bird from the danger zone has decreased can also be applied in reverse, i.e., when the bird moves away from the wind power installation again. It has also been recognized here that it is relevant that a bird at a greater distance requires more time to reach the wind power installation than if said bird is closer to the latter. The wind power installation thus in turn has more time to reduce its rotor rotating speed, optionally to an innocuous rotating speed, and can therefore already increase the rotor rotating speed, this potentially leading to a greater output yield.

According to one aspect, it is proposed that the wind power installation is operated at a protective rotating speed and generates output as long as the endangered bird is situated in the danger zone. As has also been already explained above, the protective rotating speed is a rotating speed which is considered innocuous to the endangered bird, even when the latter is present in the danger zone. It is thus proposed in particular that the protective rotating speed is established as a function of the bird species identified.

Such a protective rotating speed is a comparatively minor rotor rotating speed which is chosen such that the blade tip speed is preferably less than 120 km/h, in particular less than 60 km/h, and furthermore particularly 30 km/h (8.3 m/s). It has been recognized here that birds, in particular dependent on their bird species, are at risk by rotors of wind power installations only when these rotors rotate too fast. In principle, birds are accustomed to fly such that they do not collide with other moving objects as long as the latter do not move too fast.

This knowledge has been utilized here and it has been recognized that the wind power installation can even be operated at such a slow protective rotating speed so that said wind power installation delivers output. Such an output will be below the output which could be generated if the wind power installation would not have to be reduced to the protective rotating speed. However, it has been recognized that at least some output can be generated.

The protective rotating speed here depends in particular on the bird species identified. In particular, the protective rotating speed can be higher the faster the bird per se can fly. It has been recognized here that birds can readily estimate the speed and movement of an object as long as said object moves at approximately the speed at which the bird per se can fly. It has also been recognized that the visual capacity may have an influence. In particular, a higher protective rotating speed is chosen for birds of prey than for other birds and for bats.

According to one aspect it is proposed that the rotor rotating speed is reduced to the protective rotating speed which is considered to pose no risk to the endangered bird when the endangered bird flies into the response region. The rotor rotating speed is reduced further to zero or to a coasting rotating speed when the endangered bird flies into a reduced preliminary danger zone which has a zone boundary that lies within the response region but outside the danger zone. The rotor rotating speed in the process is reduced to the extent that said rotor rotating speed attains the coasting rotating speed, or the installation is stopped before the endangered bird has reached the danger zone.

To this end it is moreover proposed that the wind power installation continues to be operated at this protective rotating speed and in particular generates power in the process until the bird reaches the preliminary danger zone. It is thus explicitly proposed that the installation continues to be operated while generating output, albeit to a reduced extent, despite endangered birds being in the preliminary danger zone.

Here too, it is proposed that the response rotating speed and/or the protective rotating speed are/is predefined as a function of the bird species of the endangered bird.

In this way, this aspect provides simplified controlling, the latter differentiating substantially between three rotor rotating speeds, specifically a normal rotor rotating speed, the protective rotating speed, and the coasting rotating speed, or zero. When the endangered bird flies into the response region, a reduction of the rotor rotating speed to the protective rotating speed is thus performed in one step. The latter speed is thus slower than the normal rotor rotating speed, thus slower than the rotor rotating speed at which the wind power installation was operated prior to the bird flying into the response region.

If the bird now continues to approach the danger zone, the reduction of the rotating speed is continued, specifically to the coasting rotating speed or to zero, as soon as said bird has reached the preliminary danger zone. This last reduction in this further step is thus performed without mandatorily having to precisely track the distance of the bird from the danger zone. The implementation of these simple stages is advantageous because it avoids shutdown of the wind power installation, or at least premature shutdown or stopping thereof.

Conversely, the wind power installation can thereafter also be returned to the normal operation once the endangered bird has left the response region again.

This aspect thus proposes two steps which are simple to implement but nevertheless permit more yield than in a variant in which the wind power installation is immediately stopped once a bird has penetrated the response region.

According to one aspect, it is proposed that the wind power installation, as long as the latter is not operated at the nominal rotating speed and the nominal output, thus in particular in the partial-load operation, is operated using an operational characteristic curve in which an electrical or mechanical output, or a generator torque, is predefined as a function of the rotor rotating speed. A normal characteristic curve is used here as the operational characteristic curve when no endangered bird approaching the wind power installation has been identified. To this end, it is furthermore proposed that a bird-protecting characteristic curve which in comparison to the normal characteristic curve has higher output values or generator torque values at respectively identical rotor rotating speed values, or has a reduced rotating speed at the same output and/or the same generator torque, is used as the operational characteristic curve when an endangered bird approaching the wind power installation has been identified. Moreover or alternatively, the use of the bird-protecting characteristic curve is proposed when an endangered bird has been identified in a region outside the response region. Moreover or alternatively, it is proposed that a bird-protecting characteristic curve is used when there is a high probability that an endangered bird flies into the response region. This is proposed in particular when there is a higher-than-average probability in this respect.

This aspect thus assumes that the wind power installation in the partial-load operation is operated using an operational characteristic curve. Such an operational characteristic curve can also be referred to as a rotating speed/output characteristic curve, or as a rotating speed/torque characteristic curve.

The wind speed in the partial-load operation is below a nominal wind speed so that the wind power installation cannot generate a nominal output. In this case, a wind power installation is usually operated such that an ideal tip speed ratio is present. Accordingly, the wind power installation is controlled such that the rotating speed also increases as the wind speed increases, since the tip speed ratio is the quotient of rotating speed and wind speed, or of revolving speed of a blade tip and wind speed.

To this end, a correspondingly optimal rotating speed/output characteristic curve, or rotating speed/torque characteristic curve, which is referred to here as the normal characteristic curve, is predefined. Using the example of the rotating speed/output characteristic curve, controlling is performed such that the rotating speed is detected and an output is set according to the characteristic curve. The rotating speed/output characteristic curve thus indicates an output to be set as a function of the rotating speed. For example, if the rotating speed set is lower than the output which is extracted from the wind by the rotor at this moment, the rotating speed increases. Accordingly, a higher output value can be derived from the rotating speed/output characteristic curve in this instance, because the rotating speed/output characteristic curve is a characteristic curve that increases along with the rotating speed, and this takes place as long as the output value set corresponds to the output which can be extracted from the wind at this moment. A stable operating point has then been found.

Controlling of a rotating speed/torque characteristic curve, which indicates a torque to be set as a function of the detected rotating speed, also takes place in an analogous manner.

The bird-protecting characteristic curve for identical rotating speed values has higher output values, or higher values of the generator torque. This leads to the output extracted from the wind being achieved already at lower rotating speeds, and thus to the stable operating point being reached so that the bird-protecting characteristic curve leads to a rotating speed which is reduced in comparison to the normal characteristic curve.

It has been recognized here that by using another operational characteristic curve, thus the bird-protecting characteristic curve instead of the normal characteristic curve, a reduction of the rotating speed is indeed achieved but a large reduction in output does not necessarily have to be associated therewith. A reduction in output is derived only to the extent that the bird-protecting characteristic curve is less optimal than the normal characteristic curve. Therefore, a lower output has to be taken into account, but the latter is only slightly below the output that can be achieved using the normal characteristic curve.

In this way it has been recognized that a reduction in the rotating speed can be achieved without a great reduction in output. At the rotor rotating speed thus reduced, the wind power installation can thus be more closely approached by an endangered bird before the wind power installation in terms of the rotating speed thereof has to be further reduced for protecting the endangered bird.

However, the rotating speed cannot be reduced in an arbitrary manner while providing an almost identical output by such a bird-protecting characteristic curve. On the one hand, this results in an operating point which becomes increasingly worse in aerodynamic terms and in particular bears the risk of stalling.

On the other hand, the same output at a reduced rotor rotating speed can only be achieved by a correspondingly increased generator torque. However, the generator torque cannot be increased in an arbitrary manner in a generator. However, it has been recognized that the generator in the partial-load operation is usually not yet operated at the maximum generator torque and there is therefore often the possibility to raise the generator torque and in this way reduce the rotor rotating speed by the bird-protecting characteristic curve without appreciably reducing the output.

This behavior is proposed in particular when an endangered bird approaching the wind power installation has been identified. The choice of the bird-protecting characteristic curve can in particular take place already when the response region has not even been reached by the bird yet. It has been recognized here that such a reduction in rotating speed, in which the output is barely reduced, may also be carried out preventively.

According to one variant it is therefore also proposed that the bird-protecting characteristic curve is used when an endangered bird has been identified in a region outside the response region.

It is likewise proposed as a prevention that the bird-protecting characteristic curve is chosen when there is a high, in particular higher-than-average, probability that an endangered bird flies into the response region. It can be provided in particular that the wind power installation at night is operated using a normal characteristic curve while using the bird-protecting characteristic curve during the day. The exact reverse could be proposed if no bats are anticipated. Returning to the example of the bird, an endangered bird is not to be anticipated at night. The probability is thus higher during the day and, calculated over a 24-hour day, the probability that an endangered bird flies into the response region is higher than average during the day.

It is preferably proposed that the response region is set as a function of the bird-protecting characteristic curve. This is based on the concept that the bird-protecting characteristic curve generally leads to a reduced rotating speed and an endangered bird can thus approach the wind power installation up to a shorter distance before the rotor rotating speed has to be further reduced. This can be taken into account by the altered response region.

According to one aspect it is proposed that the rotor rotating speed, when an endangered bird approaching the wind power installation has been identified, is reduced by increasing the generator torque. Moreover or alternatively, it is provided that the rotating speed is reduced by adjusting the blade angles of the rotor blades.

Increasing the generator torque leads immediately to braking of the rotor, and thus to a reduction of the rotor rotating speed. A rapid reduction in the rotating speed is possible as a result. Consequently, the output may drop with a temporal delay, because the rotating speed is reduced and the output is proportional to the product of rotating speed and torque. Likewise, the output can be increased which in fact is likewise implemented in that the generator torque is increased. In principle, electrical braking by the generator is achieved as a result. This electrical braking is provided in particular as a temporary reduction in the rotating speed and, particularly in terms of the intensity and in part also the potential duration, is also restricted by the electrical limits of the wind power installation.

This reduction in the rotating speed is expedient in particular when a bird only briefly leads to a reduction in the rotating speed. It is proposed in particular in longer-term reductions in the rotating speed that the blades are additionally adjusted. A long-term reduction can be achieved as a result. In this way, electrical braking can first take place, this thereafter being supplemented by adjusting the rotor blades if necessary.

In particular when electrical limits and/or the current operating point do/does not permit an increase in the generator torque, it can be provided that only the rotor blades are adjusted, and/or the rotor blades are adjusted immediately, thus turned out of the wind.

An adjustment of the rotor blades in terms of their blade angles can additionally be carried out. In particular when the rotor rotating speed is to be heavily reduced, in particular to a protective rotating speed, the actuation of the generator may not be sufficient to this end and the deceleration of the rotor can be supplemented by the adjustment of the blade angle of the rotor blades.

According to one aspect it is proposed that the reduction of the rotor rotating speed is set as a function of a detected flying speed of the endangered bird identified, and/or a typical, in particular maximum, flying speed of the bird species of the endangered bird identified, and/or a direction of flight of the endangered bird identified, and/or an estimated minimum approach time which the endangered bird identified is anticipated to at least need to reach the danger zone from the current position of said bird.

It is thus proposed specifically that the detected and/or anticipated movement of the endangered bird identified is also incorporated.

It can be computed from a detected flying speed of the bird how much time said bird needs to overcome the current distance from the danger zone.

Moreover or alternatively, a typical, in particular maximum, flying speed can be taken into account, the latter being known by virtue of the identified bird species of the endangered bird identified. In principle, the minimum time which the bird may need to reach the danger zone can be computed as a result. The use of the maximum flying speed for determining the minimum time is the safest method for this purpose. However, if it is known, for example, that the maximum flying speed is usually not attained, or not attained in the region of a wind power installation, a typical flying speed may be used.

Moreover or additionally, it is proposed that the flight direction of the bird is taken into account. For example, if the bird flies rapidly into the response region but in a direction which does not at all point towards the danger zone, the rotor rotating speed at times does not need to be reduced, or not reduced so heavily.

According to an additional or alternative proposal, a minimum approach time which the endangered bird identified is anticipated to at least need to reach the danger zone from the current position of said bird is estimated. Such an estimation of the minimum approach time can take into account the criteria already mentioned such as detected flying speed, maximum flying speed and detected flight direction. However, other criteria may also be resorted to, such as an identified acceleration or a reduction of the flying speed of the endangered bird identified. Besides a flight direction, a change in the flight direction may also be taken into account. For example, if the bird is flying in a circle, this can be taken into account when estimating the minimum approach time. The minimum approach time may however also be a computation with a high confidence level, which proceeds from the most unfavorable conditions.

It also has to be taken into account that the reduction in the rotor rotating speed as a function of the detected flying speed does not mean that the time to reach the danger zone is exactly computed therefrom and the rotor rotating speed only then attains the protective rotating speed, but other aspects of confidence may also be taken into account here. For example, it can be provided that the protective rotating speed is attained one, two or five seconds before the bird may reach the danger zone as anticipated.

According to one aspect it is proposed that the wind power installation is operated at a variable safe rotating speed which defines a rotating speed that is continually adapted to the current bird position, wherein the safe rotating speed is chosen such that the rotor rotating speed, proceeding from the safe rotating speed, can be reduced to the protective rotating speed or a coasting rotating speed in the time which the endangered bird is anticipated to need from the current bird position thereof at least to the danger zone. To this end, it is proposed in particular that the safe rotating speed is chosen such that the reduction of the rotor rotating speed from the safe rotating speed to the protective rotating speed or coasting rotating speed is ensured without emergency braking and with continued operation and continued output generation.

As a result, the rotor rotating speed can always be optimally adapted to the bird position. In other words, the safe rotating speed is always further reduced when the bird approaches the danger zone, whereas said safe rotating speed can be continually increased when the bird moves further away from the danger zone.

This is based in particular on the concept that the bird often does not fly to the danger zone at all, but that this cannot be precluded. It is thus always checked how long it may still take for the bird to reach the danger zone if the bird should direct its flight in the direction of the danger zone from its current position. In this way, it is always guaranteed in this instance that the protective rotating speed or coasting rotating speed can still be attained in good time. However, as long as the bird is at a corresponding distance, the rotating speed can be chosen to be correspondingly higher. The safe rotating speed is thus the maximum rotating speed which can be chosen without posing a risk to the bird.

It has been recognized in particular here that the wind power installation can continue to be operated at this reduced rotating speed, specifically the safe rotating speed. Output can furthermore be generated, said output optionally having to be reduced if the bird behaves such that the safe rotating speed has to be reduced and the latter is not possible without reducing the output. It is proposed in particular here that the safe rotating speed is however chosen to be so low that the protective rotating speed or coasting rotating speed can be attained without emergency braking in the odd case in which the bird does indeed directly fly in the direction of the danger zone. In other words, the safe rotating speed is chosen to be lower than a rotating speed from which the protective rotating speed or coasting rotating speed could be attained only by emergency braking.

This is based on the concept that a safe rotating speed which is lower than absolutely necessary is indeed chosen, but the wind power installation as a trade-off can continue to operate consistently.

It has been recognized in particular that a safe rotating speed chosen to be excessively low, which specifically could be reduced to the protective rotating speed or coasting rotating speed only by emergency braking, also automatically leads to such emergency braking having to be initiated when the endangered bird identified suddenly flies in the direction towards the danger zone. Such emergency braking would thus have to be initiated even when the bird a few moments later does not continue to fly further in the direction of the danger zone.

However, if the safe rotating speed is chosen such that emergency braking is not required, the rotor rotating speed in the latter case can be somewhat reduced in a simple manner while the wind power installation continues to operate. If the bird then changes its flight direction, the wind power installation continues to be at a stable operating point and the rotor rotating speed can furthermore also be readily increased if the bird removes itself further away from the danger zone.

According to one aspect it is proposed that the rotor rotating speed, the rotating speed/distance function, the protective rotating speed and/or the response region are/is selected as a function of at least one of the following criteria.

One criterion is a visibility range in the environment of the wind power installation, in particular in the response region of the wind power installation. It is to be considered in the case of a poor visibility range that the endangered bird is not identified in good time, if said bird is however identified in good time, for example because a corresponding technical apparatus, for example a radar apparatus, is used for identification, it is to be considered that the bird flies at a correspondingly lower speed.

A further criterion is an agricultural activity in the environment of the wind power installation, in particular in a range of up to 10 kilometers, in particular up to 5 kilometers, from the wind power installation. The range can thus be a circle having a diameter of up to 20 kilometers, or up to 10 kilometers, about the wind power installation, the wind power installation thus being in the center. It has been recognized in particular here that many birds follow an agricultural activity such as harvesting or ploughing a field because prey animals are disturbed thereby. Such an agricultural activity thus influences the behavior of the birds.

A further criterion is a thermal in the environment of the wind power installation, in particular in the range of up to 10 kilometers, in particular up to 5 kilometers, from the wind power installation. Such a thermal likewise influences the behavior of many bird species, as has already been described above.

A further criterion is a preferred direction of flight of the endangered bird. It is to be considered here in particular that the endangered bird is a migratory bird which thus flies particularly in one direction and does not deviate therefrom, optionally depending on the time of day. If such a migratory bird flies in its preferred direction of flight, or usually many such migratory birds appear at the same time, and in the process would not fly directly towards the wind power installation, it can hardly be anticipated that said bird will alter its course and reach the danger zone. A corresponding response can be taken in that a reduction of the rotor rotating speed can be omitted, for example, or a lesser reduction can be chosen.

A further criterion is a position of the wind power installation in relation to a habitat and/or a hunting ground of the endangered bird. Particular attention is required in particular when the wind power installation is disposed between the habitat and the hunting ground. If the wind power installation is not precisely between the habitat and the hunting ground, thus only on the periphery, it is not to be anticipated that the bird chooses to deviate via the wind power installation between the habitat and the hunting ground, so to speak.

It is thus to be considered that the rotor rotating speed is selected as a function of the visibility range, the agricultural activity, the thermal, the preferred direction of flight and/or the position of the wind power installation.

It is likewise proposed that the rotating speed/distance function is selected as a function of the visibility range, the agricultural activity, the thermal, the preferred direction of flight and/or the position of the wind power installation.

It is likewise proposed that the protective rotating speed is selected as a function of the visibility range, the agricultural activity, the thermal, the preferred direction of flight and/or the position of the wind power installation.

It is likewise to be considered that the response region is selected as a function of the visibility range, the agricultural activity, the thermal, the preferred direction of flight and/or the position of the wind power installation.

According to one aspect, it is proposed that behaviors of endangered birds are recorded in the operation of the wind power installation, behavioral patterns are derived from the recorded behaviors, in particular for the respective bird species identified, and the wind power installation is controlled as a function of the derived behavioral pattern. To this end, the rotor rotating speed, the rotating speed/distance function, the protective rotating speed and/or the response region can in particular be controlled as a function of the derived behavioral pattern.

All above-mentioned criteria of the behavior of birds can in principle be considered to be recorded behaviors. This includes which direction of flight such birds assume, how fast the latter fly, how intensely said birds alter their direction of flight and/or speed. It can also be considered a behavior from which direction said birds arrive and in which direction they fly. To this end, criteria such as time of day, season and bird species can be recorded. Also the criteria explained, such as visibility range, agricultural activity, thermal, preferred direction of flight and position of the wind power installation in relation to habitat and/or hunting ground can also be taken into consideration.

Derived to this end can be a behavioral pattern, for example at which time the bird changes between the habitat and the hunting ground. In order to mention but one further example, it can also be considered in which season and/or at which time of day an endangered bird of a specific bird species takes which flight routes through the response region of the wind power installation. All such behavioral patterns can be recorded and the wind power installations can be correspondingly controlled. For example, if it has been recorded as a behavioral pattern that a bird of a specific bird species, or possibly even a specifically identifiable bird, always takes a specific flight route through the response region of the wind power installation but never comes close to the danger zone of the wind power installation, it can thus be provided that the rotor rotating speed is not reduced even when the endangered bird flies into the response region, which would normally lead to a reduction in the rotor rotating speed.

It is to be noted here that this does not necessarily mean that this non-reduction of the rotor rotating speed leads to a risk to the bird, should the latter as an exception indeed change its direction of flight towards the danger zone. It can specifically also mean that it is still always possible in this instance for the rotor rotating speed to be reduced in a timely manner even if this should take place in the manner of an emergency stop, which is actually undesirable. However, the risk of such an emergency stop can be accepted if such an emergency stop is highly improbable by virtue of the derived behavioral pattern and therefore is carried out extremely rarely or possibly not at all.

According to one aspect, it is proposed that reductions of the rotor rotating speed are recorded, in particular according to number, amplitude and/or duration, and a service life computation for the wind power installation is carried out or adapted as a function of the recorded reductions.

This is based in particular on the concept that a wind power installation is conceived for a specific service life. In a customary operation, this service life can be reached after 20 years, for example. However, the service life here depends very much on the current stress. When the wind power installation is conceived for the 20 years mentioned by way of example, this has been based on average stress.

However, if reductions of the rotor rotating speed are now carried out, in particular when the latter are not carried out as an emergency stop but rather in a continuous and gentle manner, this may reduce the stress on the wind power installation. Such a reduction of the rotor rotating speed is undesirable at a first glance, because less output is generated as a result and the yield is thus reduced. However, it has now been recognized that this in turn results in the advantage that the service life can be increased as a result of this reduction of the rotor rotating speed.

If these reductions of the rotor rotating speed are correspondingly recorded and such a service life can be reliably recomputed, the wind power installation can then be operated for a correspondingly longer time. The annual yield of the wind power installation, which may have decreased as a result of the reduction of the rotor rotating speed, cannot be increased as a result, but a certain degree of compensation can nevertheless be achieved in that the wind power installation can be operated perhaps for half a year or an entire year more, and a yield can of course be achieved in that time.

Also proposed is a wind power installation which has a rotor having rotor blades that are adjustable in terms of their blade angle, and having a rotor diameter, wherein the rotor is able to be operated at a variable rotor rotating speed, and a region in which the rotor blades move forms a danger zone for birds and bats, wherein the wind power installation is prepared to carry out a method comprising the following steps:

checking whether a bird or bat approaching the wind power installation is an endangered bird; and if an endangered bird has been identified;

detecting a bird position as the current position of the endangered bird identified; and controlling the rotor rotating speed as a function of the bird position in relation to the wind power installation, wherein the rotor rotating speed is reduced in multiple stages or continuously as the distance of the bird position from the wind power installation is reduced.

The wind power installation is thus prepared to carry out such a method. To this end, said wind power installation has in particular a corresponding control installation in which the method steps can be implemented.

A bird detection installation for detecting an endangered bird, this also including the detection of a bat, can be provided. Such bird detection installations are known in principle. Said bird detection installations can identify birds or bats optically and/or by infrared and/or by ultrasound and/or by radar. As a result, said bird detection installations can identify the position of the bird. A speed, direction, change in speed and change in direction can be derived and thus identified by recording a plurality of positions at temporal intervals. Moreover, bird detection installations which also can identify a bird species, including a bat or a bat species, are proposed in particular. Such an identification can in particular be carried out by way of the shape, the flight behavior, including the frequency of wing flapping motions, also colors and other appearance features of the bird, and optionally also by way of sounds of the bird or the bat.

Such a bird detection installation here is in particular connected to the control installation so that part of the evaluation, and/or the derivation of a change in controlling the wind power installation, can be carried out on the control installation.

According to one aspect, it is thus proposed that the wind power installation has a bird detection installation for detecting a bird or a bat, in particular according to position and/or species. The detection according to species thus means the detection of a bird species, this including the detection of a bat species or the detection that the flying animal is a bat in the first place.

Moreover or alternatively, the wind power installation thus has a control installation and this control installation can be prepared to carry out a method according to one of the embodiments described above.

BRIEF DESCRIPTION OF THE SEVERAL VIEWS OF THE DRAWINGS

The invention will be explained in more detail hereunder by way of example by means of exemplary embodiments with reference to the appended figures in which.

DETAILED DESCRIPTION

Figure 1:
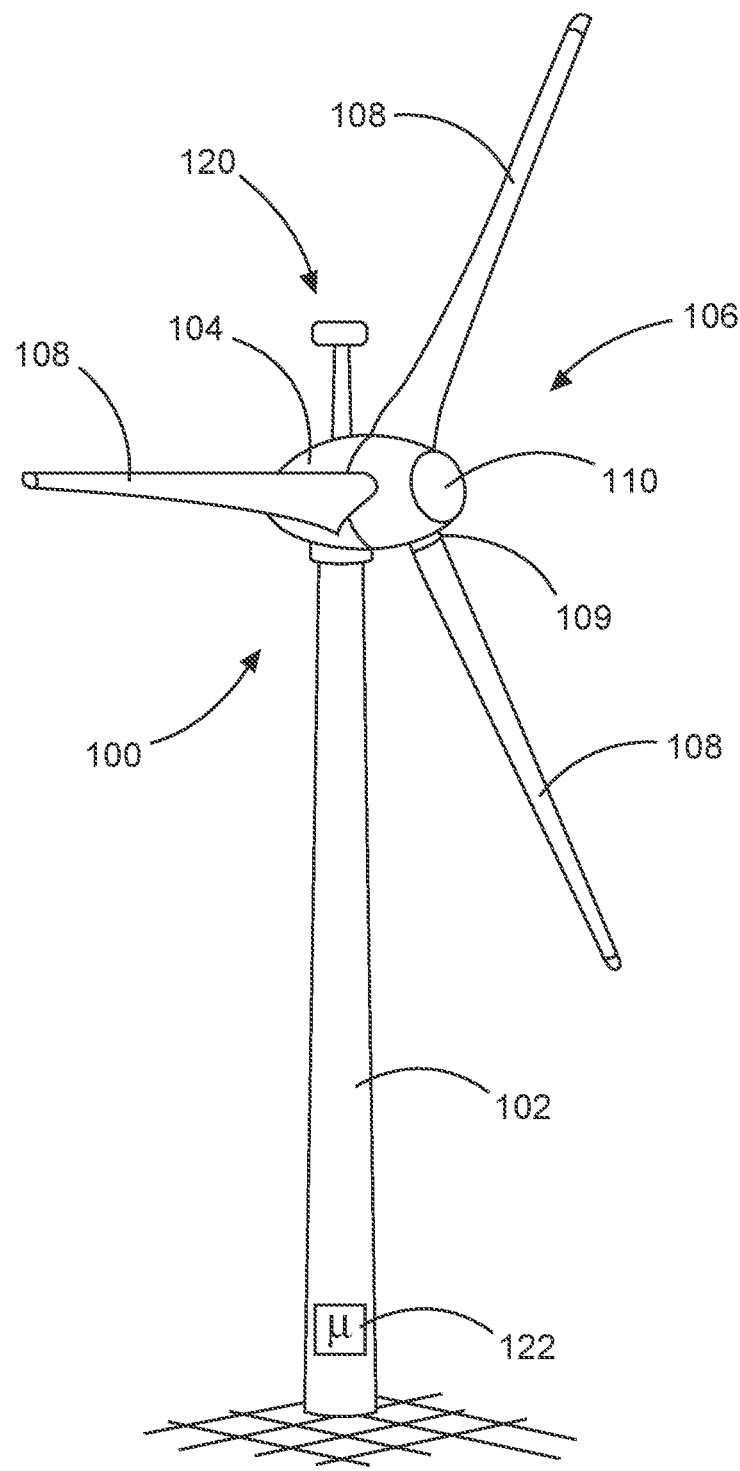
FIG. 1 shows a wind power installation in a perspective illustration.

FIG. 1 shows a wind power installation 100 having a tower 102 and a nacelle 104.

A rotor 106 having three rotor blades 108, each having a blade root 109, and a spinner 110 is disposed on the nacelle 104. During operation, the rotor 106 is set in a rotating motion by the wind and as a result drives a generator in the nacelle 104.

Disposed by way of example on the nacelle 104 is a bird detection installation 120 which is coupled to a control installation (such as a controller or microcontroller or the like) 122. The control installation 122 is provided in particular for controlling the wind power installation, in particular the rotating speed, the output and/or the torque of said wind power installation, and a blade position of the rotor blades 108. For the sake of improved clarity, the control installation 122 is illustrated in the base of the tower but can also be provided in particular in the nacelle 104, specifically close to the bird detection installation 120 and also close to other actuating installations such as a blade adjustment installation.

However, this arrangement is only by way of example, and other variants may be provided. Preferred variants are in particular a tower assembly, thus an assembly on the tower, and also a stand-alone position on a mast in a wind farm, for example high-performance radars or camera arrays. The sensor system is preferably installed outside the rotor area so as not to impede the detection. To this extent, these variants differ from that illustrated in FIG. 1.

A link to a farm or wind power installation control and power supply can then take place by way of an underground cable. The evaluation unit can also be in a transfer station, a technical systems container or a control room, for example, and be linked to a SCADA infrastructure by a network.

The bird detection installation 120 thus detects any birds or bats and in the process can identify the species of the bird, or of the bat, respectively, as well as the position of the latter and also track said position in real time. Such data are forwarded to the control installation which as a function thereof can perform or alter controlling of the wind power installation. The control installation 122 can also derive further items of information from the received data, such as a direction of flight and a flying speed. In particular, the control installation 122 conjointly with the bird detection installation 120 is prepared to carry out a method as will be explained by way of example in FIG. 4.

Figure 2:
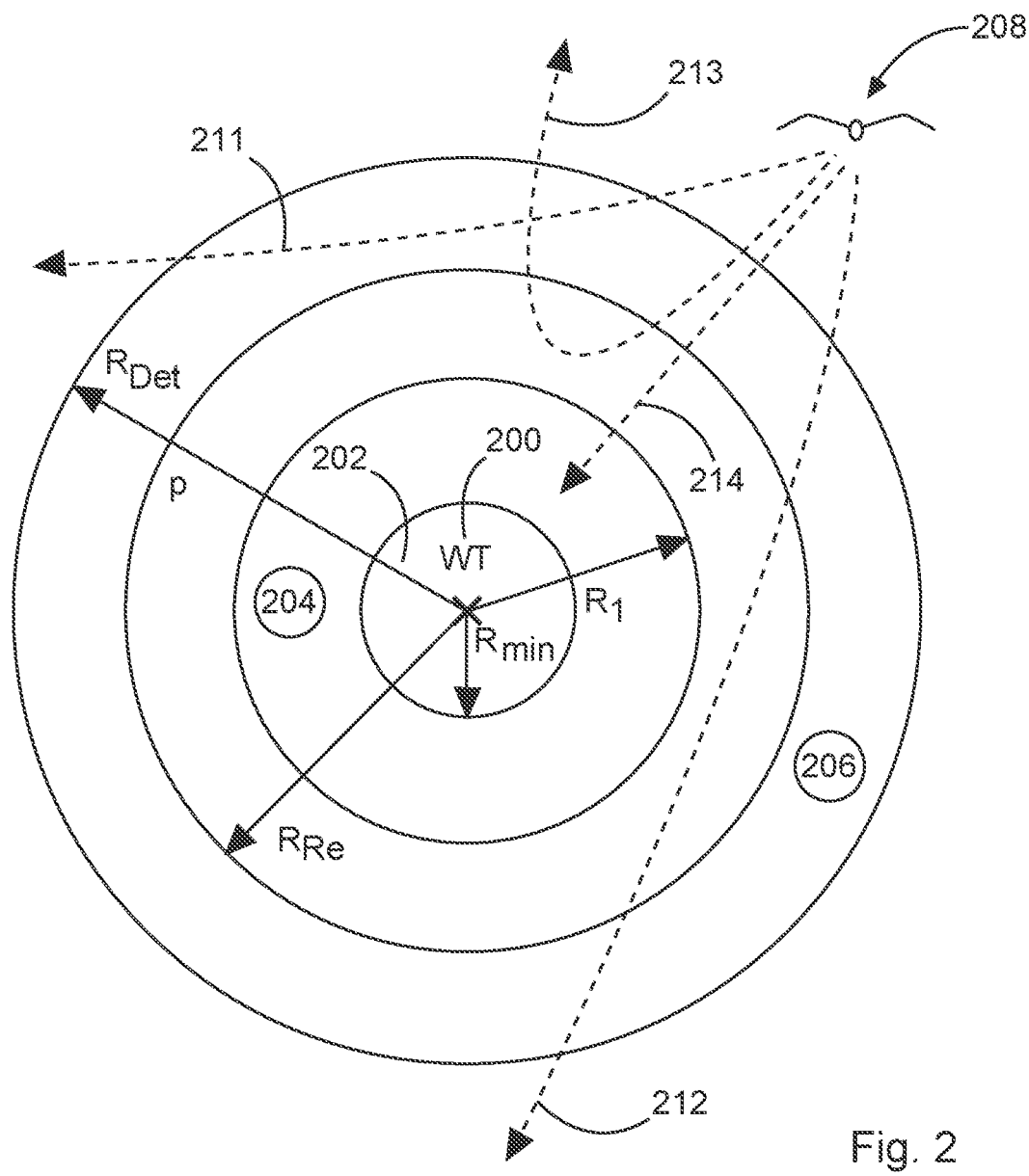
FIG. 2 shows various relevant regions about a wind power installation, visualized by circles.

FIG. 2 visualizes a wind power installation 200 which can also be referred to as WT and in FIG. 2 forms only the center of the regions explained hereunder.

A circle with the radius $R_{min}$ which visualizes a danger zone 202 is plotted directly about the wind power installation 200. This danger zone 202 is placed directly about the wind power installation 200 and the radius $R_{min}$ thereof corresponds to the radius of the rotor of the wind power installation, which however is not illustrated in FIG. 2. FIG. 1 shows a rotor 106, the radius of the latter being able to be used here. The radius $R_{min}$ of the danger zone 202 is preferably somewhat larger than the radius of the rotor of the wind power installation, thus of the aerodynamic rotor of the wind power installation. For example, said radius $R_{min}$ may be 10% or 20%, or else 50%, larger.

Figure 3:
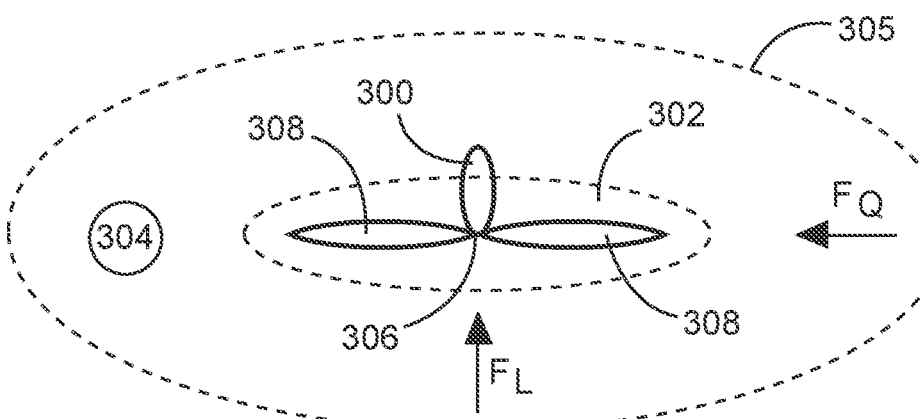
FIG. 3 shows a plan view from above onto a wind power installation for visualizing the potential shapes of regions about the wind power installation.

The danger zone 202 and also the further regions of FIG. 2 yet to be explained hereunder are illustrated as circles only for the sake of simplicity. FIG. 3 explains an expedient deviation therefrom further below.

It is now provided that the wind power installation 200 is controlled such that it is ensured that the rotor rotating speed of the latter is reduced to a protective rotating speed before a bird or a bat makes its way into the danger zone 202.

The response region 204 is situated about the danger zone 202. The response region 204 is denoted by the radius $R_{Re}$. If a bird or a bat reaches the response region, it is proposed that response takes place by way of a reduction of the rotor rotating speed. This can take place in stages, or ideally continuously, depending on the distance from the danger zone 202. This is visualized by the radius $R_1$. $R_1$ can thus be understood to be the decision boundary from which the reduction in the rotating speed is initiated. For the sake of simplicity, this radius $R_1$, as also the other radii, relates to the wind power installation 200, or a center of the wind power installation 200. The radius $R_1$ can thus vary between the radius $R_{min}$, which denotes the danger zone 202, and the radius $R_{Re}$, which denotes the radius of the response region 204. The circle with the radius $R_1$ is thus situated in the response region 204. The reference sign 204 is thus not intended to indicate that the response region is within the circle with the radius $R_1$, but that the response region reaches up to the circle with the radius $R_{Re}$.

According to one variant, the radius $R_1$ can denote a zone boundary of a preliminary danger zone.

Furthermore visualized is an identification region 206. The identification region is thus denoted by the outermost circle with the rotor radius $R_{Det}$. A bird detection installation, such as the bird detection installation 120 shown in FIG. 1, can detect and identify a bird or bat within this identification region 206. In this way, a bird or a bat can be detected before it reaches the response region 204, or the circle with the radius $R_{Re}$, respectively.

A plurality of visualizing flight routes of a bird 208, shown by way of example, are plotted in FIG. 2.

In the case of the first flight route 211, the bird 208 flies into the identification region 206. The bird 208 is then identified and its position is continually detected. It can additionally be provided that a first reduction in the rotating speed in which the wind power installation changes its operational characteristic curve, thus a rotating speed/output characteristic curve or rotating speed/torque characteristic curve, is already initiated as a precaution. As a result, the rotating speed can be reduced without the generated output being appreciably reduced. Such a reduction in the rotating speed without an appreciable reduction of the output is of course not possible in an arbitrary manner but can be carried out depending on the operational situation. In this instance, output losses result only within the scope of the resultant deviation from the optimal operating point.

According to the first flight route 211, the bird, which here also represents a potential bat, does not reach the response region 204. Therefore, a reduction in the rotating speed would not have to take place and the reduction in the rotating speed mentioned by changing the operational characteristic curve is to this extent also only an optional precautionary measure.

In the case of the second flight route 212, the bird flies not only into the identification region 206 but also into the response region 204. However, because the bird flies past the wind power installation 200 at a substantially large distance said bird, according to this second flight route 212, soon also leaves the response region 204 again, and moreover also the identification region 206.

A reduction of the rotor rotating speed nevertheless takes place as soon as the bird 208 on the second flight route penetrates the response region 204, or as soon as the bird 208 reaches the circle with the radius $R_{Re}$.

However, it is only proposed that the rotor rotating speed is somewhat reduced and the further flight profile of the bird 208 is observed. Here, said bird 208 leaves the response region 204 again so that the rotating speed can be increased again to the rotating speed which was present before the bird 208 reached the response region 204.

The third flight route 213 likewise shows the case in which the bird 208 flies into the identification region 206, moreover then also flies into the response region 204, however turns back thereafter and leaves the response region 204 and thereafter also the identification region 206 again.

Controlling the wind power installation here can take place in a manner very similar to in the example of the second flight route 212. The rotor rotating speed is specifically reduced as soon as the bird 208 reaches the response region 204, and the rotor rotating speed can be successively reduced further while the bird continues to approach the wind power installation 200 and thus the danger zone 202. The rotating speed can be increased again at the moment at which the bird according to the third flight route changes the direction and flies further away again from the wind power installation 200, or the danger zone 202, respectively.

According to one option it is provided that, besides the respective position of the bird, thus the bird position, the flight direction and flying speed of said bird is also taken into account. In the case of the second flight route and the third flight route, this would potentially lead to different behaviors of the wind power installation.

In the case of the second flight route 212 it can be seen by virtue of the direction of flight that the bird does not fly towards the wind power installation 200, or the danger zone 202, so that a lesser reduction of the rotor rotating speed may be appropriate even in the case of an identical distance of the bird position from the danger zone 202.

Instead, the bird according to the third flight route flies almost directly towards the danger zone 202 so that it is initially to be anticipated that the bird will soon also reach the danger zone 202. The time in which said bird would reach the danger zone can be computed or at least estimated, and the rotor rotating speed must be able to be reduced to a protective rotating speed within this time. The rotor rotating speed is thus reduced more heavily, the closer the bird 208 comes to the danger zone 202.

The rotor rotating speed can be increased again at the moment at which the bird according to the third flight route 213 in principle veers and removes itself again.

Finally, a fourth flight route 214, which in principle applies to the situation that is the most dangerous to the bird 208, is also plotted. The bird 208 specifically flies directly towards the wind power installation 200 and thus towards the danger zone 202 and also reaches the danger zone 202. The dashed arrow which visualizes the fourth flight route 214 terminates ahead of the danger zone 202 only for the sake of improved clarity. However, in the example it is assumed that the bird flies into the danger zone, and controlling the rotor rotating speed, specifically in particular reducing the rotor rotating speed, is performed such that said rotor rotating speed has been reduced to the protective rotating speed just prior to the bird 208 reaching the danger zone 202.

The wind power installation can then continue to be operated at the protective rotating speed as long as the bird is situated in the danger zone. As soon as the bird removes itself again, the rotor rotating speed can be increased again. However, if the bird 208 removes itself such that it continues to remain in the response region 204, the rotor rotating speed can be further increased, specifically depending on the position, specifically the distance, of said bird from the danger zone, but not increased to the rotating speed which was present before the bird reached the response region 204.

The wind power installation thus continues to operate, having a changing rotating speed in the process, this changing rotating speed being less than if the bird were to be outside the response region (it could optionally also be considered that the wind power installation, which can be abbreviated as WEA, is switched off despite a previously reduced rotating speed, as soon as it is computed in advance that the bird will most probably fly into the danger zone). However, as soon as the bird would leave the response region again also in this example, the wind power installation would continue to be operated at an entirely normal rotor rotating speed again. By virtue of the rotor rotating speed being continually readjusted based on the bird position, it is also readily possible for the normal rotor rotating speed to be reassumed immediately once the bird has left the response region 204.

Another variant can be explained by way of the fourth flight route, specifically when a preliminary danger zone is provided and the radius $R_1$ denotes the zone boundary of the preliminary danger zone. In this case, reaching the response region leads to a first reduction of the rotor rotating speed to a response rotating speed. However, the bird 208 flies onwards and reaches the zone boundary of the preliminary danger zone, which is denoted by $R_1$, this leading to a further reduction step in which the rotor rotating speed is reduced to the protective rotating speed.

FIG. 3 schematically shows a wind power installation 300 having rotor blades 308 which define a rotor 306 in a plan view from above. It has been recognized here that an indicated danger zone 302, other than that shown for visualization in FIG. 2, is adapted to the rotor 306 and therefore is not circular as in the visualized example for the danger zone 202 in FIG. 2.

In this way, a bird which approaches the wind power installation 300 according to a longitudinal flight direction $F_L$ can come closer before reaching the danger zone 302 than would be the case with a transverse flight direction $F_Q$.

Accordingly, the above and thus the alignment of the wind power installation 300 can be taken into account when controlling the rotor rotating speed as a function of the bird position.

In this way, the response region which here is plotted as the response region 304 can be adapted in a corresponding manner. The response region 304 to this end has a regional periphery 305 which is likewise not circular but rather has an oval shape or an elliptic shape.

Of course, the identification region 206 shown in FIG. 2 can furthermore be circular because said identification region 206 depends on the range of the bird detection installation (cf. bird detection installation 220 of FIG. 1) and should ideally have the same range in all directions. However, it is to be considered in particular that the range of such a bird detection installation is not necessarily identical in all directions, depending on the weather conditions.

Figure 4:
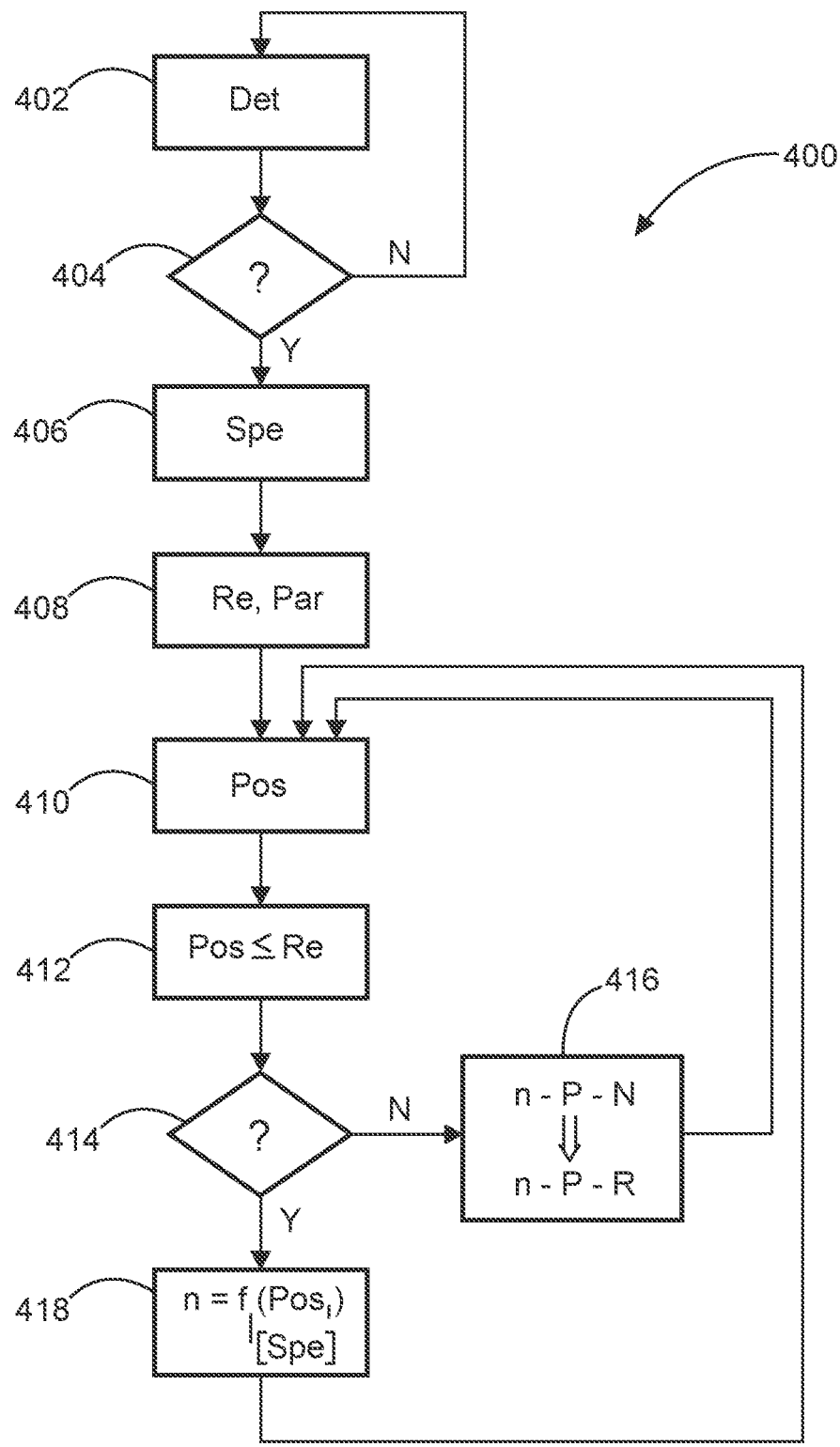
FIG. 4 shows a flow chart of a proposed method.

FIG. 4 visualizes a flow chart 400 of a proposed method for controlling a wind power installation as a function of a detected bird or bat.

At the beginning of the method, detecting a bird takes place according to a detection step 402. According to the detection step 402, identification of a bird is attempted. Here too, the bird is likewise also representative of a bat. The detection step 402 in principle is continually carried out by a bird detection installation. In other words, such a bird detection installation continually seeks birds or endangered birds, respectively.

In a querying step 404 it is then continually checked in principle whether a relevant bird has been identified. If this is not the case, the loop reverts to the detection step 402, this only intended to visualize that the search for a bird is continually repeated.

However, if a bird is identified, the method continues with the identification step 406. The detection according to detection step 402 is of course also continued in parallel so as to check whether further birds are approaching.

In the identification step 406, the type of the bird is first specified. The type can also be synonymously referred to as species.

After the detection of the bird species in the identification step 406, parametrization is performed as a function thereof in parametrization step 408. To this end, the response region is established (cf. response region 204 of FIG. 2 and response region 304 of FIG. 3). In particular, a distance of a regional periphery of the response region from a danger zone or from the wind power installation is established. This considers in particular how fast the respective bird can fly. The latter specifically has a bearing on how much earlier any potential reduction in the rotating speed has to take place. If the identified bird can fly very fast, a larger response region is to be established; otherwise the latter can be established to be smaller.

Moreover, a function which sets the rotor rotating speed as a function of the position of the bird and will yet be explained later can be parametrized as a function of the bird species identified.

A detection of the position of the bird takes place as the next step in position step 410. The position can in particular be identified by the bird detection installation and can thus already be conjointly detected already in the detection step 402. It is yet again highlighted in the position step 410 that this explicit position of the bird, thus the determination of the bird position, is an important element and also has to be continually repeated, thus updated.

Based on the position thus identified, a comparison between the detected position and the response region takes place in comparison step 412. It is thus verified whether or not the bird position has reached the response region.

This is evaluated in evaluation step 414. If the bird has not (yet) reached the response region, the method moves to the characteristic curve variation step 416. In the characteristic curve variation step 416, an operational characteristic curve will be changed from a normal characteristic curve, the latter there being symbolized as the rotating speed/output normal characteristic curve n-P-N, to a reduced operational characteristic curve, specifically a bird-protecting characteristic curve which is symbolized as the reduced rotating speed/output characteristic curve n-P-R.

In this way, an operating mode with a reduced rotating speed is chosen, in which only a slight reduction in output takes place, however. Such a characteristic curve variation step 416 can however also remain undone, in particular when this is not possible, or not possible in a stable way, by virtue of marginal conditions.

In any case, the method then returns to the position step 410. This would also occur if the characteristic curve variation step 416 were to be omitted.

By returning to the position step 410 it is to be symbolized that the bird position then continues to be, in particular continually, detected.

If it is established in the evaluation step 414 that the bird has reached the response region, the method proceeds to the rotating speed setting step 418. The rotor rotating speed is then set as a function of the bird position in the rotating speed setting step 418. This is visualized by the equation n=f(Pos). The rotor rotating speed here is continually set as a function of the bird position. This initially means, of course, that the rotor rotating speed is reduced, specifically when the bird has just penetrated the response region. It can also mean, however, that the rotor rotating speed is increased again when the bird removes itself from the wind power installation again.

The function used depends however on the type of bird, thus on the species or the bird categorization performed. This is highlighted by [Spe]. This function, which is symbolically illustrated in the rotating speed setting step 418, is the function which has been set according to the parametrization step 408. In other words, this rotating speed function, which depends on the position, has thus been parametrized according to the parametrization step 408 as a function of the bird species identified.

Such a parametrization as a function of the bird species can in particular mean that with the same bird position, thus the same distance, the rotor rotating speed n to be set is lower the faster the bird according to the species identified is in principle.

After this rotating speed setting step 418, a loop returns to the position step 410 in which the position is continually recorded or updated. Accordingly, the rotor rotating speed according to the rotating speed setting step 418 can also be continually set. However, if the bird removes itself again, in particular so far that said bird leaves the response region, this is also identified in the evaluation step 414 and the rotating speed setting step 418 is correspondingly no longer actuated at all. In this case, the rotor rotating speed is specifically also already at its normal value, said rotor rotating speed having been set to the latter at the moment at which the bird reached the regional periphery of the response region, in this case specifically from the inside, so to speak.

For the sake of improved clarity it was no longer recorded in the flow chart 400 that only the loop from the detection step 402 and the querying step 404 is still carried out when the identified bird is even outside the identification region of the bird detection installation.

In the context of the invention, the following aspects have been identified, or are proposed, in particular.

Bird identification systems have a defined range in which the former can detect relevant birds. This range is referred to by $R_{Det}$ in FIG. 2.

It has been recognized that the radius $R_{max}$ which has to be undershot by a bird in order to penetrate the response region depends on the species-specific flying speed or the real flying speed and the duration which the wind power installation, the latter sometimes also being referred to as the wind power plant, requires to attain the coasting operation. The latter can be stated by the following formula:

$$R_{max} = v_{Art} \cdot t_{trudel} + D/2 \qquad (4\text{-}1)$$

where:
  $v_{Art}$ the species-specific flying speed;
  $t_{trudel}$ the time until the rotor coasts out/the speed of the rotor is regulated down;
  D the rotor diameter of the installation; and
  $R_{max}$ also denotes the external periphery of the response region and can correspond to the radius $R_{RE}$ of the response region 204 described above.

It was previously known that a shutdown of the installation is initiated when identifying an endangered bird, in particular by the following steps:

The deceleration procedure is initiated as soon as the distance between the bird and the wind power installation is less than $R_{max}$, and the wind power installation completely stops.

As soon as the bird reaches $R_{min}$ the blade tip speed must be less than 30 km/h (8.3 m/s), for example. This can be in particular an example for a red kite, and other values can be considered for other bird species. $R_{min}$ denotes the inner periphery of the response region and the outer periphery of the danger zone.

A shutdown of the installation, once initiated, cannot be cancelled/aborted while stopping. The wind power installation reduces the rotating speed until stopped and separated from the grid, there being corresponding waiting times prior to being switched on again.

The following issue has however been identified herein: birds rarely fly up to the wind power installation but veer in the response region and also leave the latter again. The wind power installation completes the stoppage nevertheless so that approx. 97% of the stoppages are not required.

In order to solve the above issue, an operating mode for avoiding the installation stoppage is proposed. The following is proposed to this end in particular:

Instead of initiating a shutdown, a specific operating mode is to be selected when a bird is identified.

The operating mode is distinguished in that switching from an operating mode for protecting a bird, which can be referred to as the "species protective OM," back to the original mode, thus a normal mode, can take place automatically and ideally without any loss of time. Such a normal mode can in particular be implemented in that a normal characteristic curve is used as the operational characteristic curve and/or there is no reduction of the rotor rotating speed.

Downtimes and increased loads as a result of the stoppage can be avoided as a result.

The direction from which the bird approaches is preferably to be incorporated so that in formula (4-1) mentioned ($R_{max} = v_{Art} \cdot t_{trudel} + D/2$) D=0, or D is approximately 0, when the bird flies longitudinally towards the wind power installation (with the wind or counter to the wind). This is visualized in FIG. 3.

Two different operating modes are proposed inter alia as alternatives.

The concept here is based on a reduction of $R_{max}$ and $R_{min}$ when reaching a lesser time $t_{trudel}$. This can be achieved by altering physical properties (mass inertia, response time, pitch speed, . . . ) or by an adapted operating mode.

It is proposed as variant a): as soon as a bird penetrates the response region, the blade tip speed is reduced to a non-critical value (species-specific, in the range of 50 to 120 km/h, or 13.8 m/s to 33.3 m/s, respectively), but at least the switch-on rotating speed. If the bird penetrates the danger zone, switching takes place to a coasting mode which defines a minimum rotating speed but does not trigger the stoppage status. The last braking procedure in particular is performed with a lower load and faster than an installation stoppage proceeding from the nominal rotating speed.

The following is proposed as variant b): as soon as a bird penetrates the response region, the blade tip speed is lowered in stepless manner and as a function of the bird distance, thus the distance of the bird, or of the bird position, from the danger zone, respectively. If a bird undershoots the distance $R_{max}$ from the wind power installation and flies towards the wind power installation at an undiminished maximum speed, the wind power installation has available a maximum time of $$t_{trudel} = (R_{max} - R_{min})/v_{Art} \qquad (4\text{-}2)$$

in order to attain a non-critical rotor blade tip speed. The maximum required acceleration of the rotor $\alpha_{min}$ is computed therefrom and from the first derivation of the correlation of the angular position and the rotational acceleration.

$$\phi = \tfrac{1}{2} \cdot \alpha \cdot t^2 + \omega_{nenn} \cdot t + \phi_0 \qquad (4\text{-}3)$$

$$d\phi/dt = \alpha \cdot t + \omega_{nenn} \qquad (4\text{-}4)$$

$$\alpha_{min} = (d\phi/dt - \omega_{nenn})/t \qquad (4\text{-}5)$$

where:

$\phi_0$, $\phi$ is the angular position of the rotor at the beginning of/after the time t;

$\omega_{nenn}$ is the nominal angular velocity;

$d\phi/dt$ is the target angular velocity which the wind power installation is to have attained after $t_{trudel}$ has elapsed; and $\alpha_{min}$ is the required (negative) acceleration of the rotor.

A characteristic curve by way of which the rotating speed is successively reduced can be derived from the formula (4-5). Accordingly, the rotating speed $d\phi/dt$ to be attained is a function of the distance $R_v$ of the bird from the wind power installation:

$$d\phi/dt = ((R_{max} - R_v) \cdot \alpha_{min})/v_{Art} + \omega_{nenn} \quad (4-6)$$

The distance $R_v$ of the bird can be visualized by the radius $R_1$ of FIG. 2.

Depending on the quality of the bird identification system or the bird detection installation and the interface for controlling the installation, $v_{Art}$ may be replaced by the current flying speed of the bird. Alternatively, the maximum flying speed or another typical flying speed of the bird species identified can be used.

If a rotor by virtue of its physical properties can implement a higher acceleration, the response distance can be conversely reduced and the output-optimized operation, which can also be referred to as the normal operation, can thus be applied for a longer period of time.

Combinations of variants a) and b) are possible, for example as follows:

- stepless feedback controlling takes place between $R_{max}$ and $R_1$;
- a constantly low minimum rotating speed is implemented between $R_1$ and $R_{min}$; and/or
- coasting takes place at a distance, thus in the case of a bird position with a distance from the wind power installation of less than $R_{min}$.

The proposed aspects are suitable for

- operational management of the wind power installation at locations with the requirement of bird protection and an installed bird identification system, and
- operational management of the wind power installation at locations with bat activity, where a shutdown of the wind power installation has been carried out to date under the precondition that an identification system is installed.

The proposed aspects are particularly provided for the following sectors:

- Erecting and operating wind power installations at locations where no permission would be granted for reasons of species protection, or locations where the operation of the installation would be uneconomical as a result of tight shutdown restrictions or downtimes, respectively.
- Reduction of downtimes of the wind power installation in the event of approaching birds and thus
  - lowering the loads by avoiding frequent stoppages,
  - lowering the losses in terms of yield, or increasing the availability of the installation, and
  - faster start-up capability of the wind power installation in order to re-attain the nominal output.

The following solutions can be achieved by the proposed aspects:

- reduction of downtimes of the wind power installation;
- reduction of the load cycles that are created by additional stoppages and start-ups of the installation;
- enhancing the start-up capability as soon as the bird leaves the danger zone/response region; and
- reversal of the wind power installation deceleration procedure if the bird should leave the response region without penetrating the danger zone.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation which has a rotor having a plurality of rotor blades with adjustable blade angles, and having a rotor diameter, wherein the rotor is able to be operated at a variable rotor rotating speed; and wherein a region in which the rotor blades move forms a danger zone for birds and bats, the method comprising:

checking whether a bird or bat approaching the wind power installation is an endangered bird, wherein in response to an endangered bird being identified:

detecting a bird position as a current position of the endangered bird identified; and controlling the rotor rotating speed as a function of the bird position with respect to the wind power installation, wherein the rotor rotating speed is reduced in multiple stages or continuously as a distance of the bird position from the wind power installation decreases.

2. The method according to claim 1, comprising:

identifying a bird species or category of the endangered bird;

establishing a response region about the wind power installation as a function of the identified bird species or category, wherein the response region has a regional periphery and the response region is defined in that the wind power installation can reduce the rotor rotating speed to a coasting rotating speed, a protective rotating speed, or to zero, before the endangered bird of the bird species identified is anticipated to reach the danger zone from the periphery of the response region;

reducing the rotor rotating speed as the endangered bird flies into the response region; and further reducing the rotor rotating speed the closer the endangered bird gets to the danger zone, without the wind power installation being shut down or stopped.

3. The method according to claim 1, wherein:

the checking comprises checking whether a plurality of birds or bats approaching the wind power installation is a plurality of endangered birds; and the controlling of the rotor rotating speed is carried out as a function of the plurality of endangered birds identified.

4. The method according to claim 2, wherein:

the rotor rotating speed is predefined according to a rotating speed/distance function, wherein the rotating speed/distance function defines a rotating speed as a function of a distance of the endangered bird from the danger zone; and/or the rotor rotating speed and/or the rotating speed/distance function is set or selected as a function of:

a season;

a time of day; and/or a bird species identified.

5. The method according to claim 2, comprising increasing the rotor rotating speed when the endangered bird leaves the danger zone and is still in the response region.

6. The method according to claim 1, wherein:
the wind power installation is operated at a protective rotating speed and generates output as long as the endangered bird is situated in the danger zone,
the protective rotating speed is a rotor rotating speed which is considered to pose no risk to the endangered bird when the endangered bird is in the danger zone, and
the protective rotating speed is established as a function of the bird species identified.

7. The method according claim 6, wherein:
the rotor rotating speed is reduced to the protective rotating speed which is considered to pose no risk to the endangered bird when the endangered bird flies into the response region,
the rotor rotating speed is reduced further to zero or to a coasting rotating speed when the endangered bird flies into a reduced preliminary danger zone which has a zone boundary that lies within the response region but outside the danger zone,
the wind power installation continues to be operated at this protective rotating speed and generates power in the process until the bird reaches the preliminary danger zone, and
the response rotating speed and/or the protective rotating speed are predefined as a function of the bird species of the endangered bird.

8. The method according claim 1, wherein:
as long as the wind power installation is not operated at a nominal rotating speed and a nominal output, the wind power installation is operated using an operational characteristic curve in which an electrical output to be set, or a generator torque to be set, is predefined as a function of the rotor rotating speed,
a normal characteristic curve is used as the operational characteristic curve when no endangered bird approaching the wind power installation has been identified, and
a bird-protecting characteristic curve which in comparison to the normal characteristic curve has higher output values or generator torque values at respectively identical rotor rotating speed values is used as the operational characteristic curve when:
an endangered bird approaching the wind power installation has been identified;
an endangered bird has been identified in a region outside the response region; and/or
when there is an increased probability that an endangered bird flies into the response region, and
the response region is set as a function of the bird-protecting characteristic curve.

9. The method according to claim 1, wherein in response to the endangered bird being identified, the rotor rotating speed:
is reduced by increasing a generator torque; and/or
is reduced by adjusting the blade angles of the rotor blades.

10. The method according to claim 1, wherein reducing the rotor rotating speed is set as a function of:
a detected flying speed of the endangered bird identified; and/or
a maximum flying speed of a bird species of the endangered bird identified; and/or
a detected direction of flight of the endangered bird identified; and/or
an estimated minimum approach time which the endangered bird identified is anticipated to at least need to reach the danger zone from the current position of the bird.

11. The method according claim 1, wherein:
the wind power installation is operated at a variable safe rotating speed which defines a rotating speed that is continually adapted to a current bird position;
the safe rotating speed is chosen such that the rotor rotating speed, proceeding from the safe rotating speed, can be reduced to the protective rotating speed or a coasting rotating speed in the time which the endangered bird is anticipated to need from the current bird position thereof at least to the danger zone; and
the safe rotating speed is chosen such that the reduction of the rotor rotating speed from the safe rotating speed to the protective rotating speed or the coasting rotating speed is ensured without emergency braking and with continued operation and continued output generation.

12. The method according claim 1, wherein:
the rotor rotating speed;
a rotating speed/distance function;
a protective rotating speed; and/or
a response region,
are selected as a function of at least one criterion from the list including:
a visibility range in an environment of the wind power installation;
an agricultural activity in the environment of the wind power installation;
a thermal in the environment of the wind power installation;
a preferred direction of flight of the endangered bird; and
a position of the wind power installation in relation to a habitat and/or a hunting ground of the endangered bird.

13. The method according claim 12, wherein the environment of the wind power installation is within a range of up to 10 kilometers from the wind power installation.

14. The method according to claim 1, comprising:
recording behaviors of endangered birds in the operation of the wind power installation;
deriving behavioral patterns from the recorded behaviors for a respective bird species identified; and
wherein:
the rotor rotating speed;
a rotating speed/distance function;
a protective rotating speed; and/or
a response region,
are controlled as a function of the derived behavioral pattern.

15. The method according to claim 1, comprising:
recording reductions of the rotor rotating speed according to number, amplitude and/or duration; and
carrying out a service life computation for the wind power installation as a function of the recorded reductions.

16. A wind power installation comprising:
a rotor having rotor blades that have adjustable blade angles, and having a rotor diameter, wherein the rotor is configured to be operated at a variable rotor rotating speed;
wherein a region in which the rotor blades move forms a danger zone for birds and bats,
a bird detection installation configured to check whether a bird or bat approaching the wind power installation is an endangered bird, and in response to an endangered bird having been identified detecting a bird position as a current position of the endangered bird identified; and a controller configured to control the rotor rotating speed as a function of the bird position in relation to the wind power installation;

wherein the rotor rotating speed is reduced in multiple stages or continuously as a distance of the bird position from the wind power installation is reduced.

* * * * *

UNITED STATES PATENT AND TRADEMARK OFFICE
CERTIFICATE OF CORRECTION

| | | |
|---|---|---|
| PATENT NO. | : 12,253,065 B2 | Page 1 of 1 |
| APPLICATION NO. | : 18/339692 | |
| DATED | : March 18, 2025 | |
| INVENTOR(S) | : Annika Länger-Möller et al. | |

It is certified that error appears in the above-identified patent and that said Letters Patent is hereby corrected as shown below:

In the Claims

Column 25, Claim 7, Line 14:
"method according claim 6," should read: -- method according to claim 6, wherein: --.

Column 25, Claim 8, Line 32:
"method according claim 1, wherein:" should read: -- method according to claim 1, wherein: --.

Column 25, Claim 10, Line 62:
"method according claim 1, wherein" should read: -- method according to claim 1, wherein --.

Column 26, Claim 11, Line 7:
"method according claim 1, wherein:" should read: -- method according to claim 1, wherein: --.

Column 26, Claim 11, Line 10:
"adapted to a current" should read: -- adapted to current --.

Column 26, Claim 11, Line 13:
"reduced to the protective" should read: -- reduced to a protective --.

Column 26, Claim 12, Line 22:
"method according claim 1, wherein:" should read: -- method according to claim 1, wherein: --.

Column 26, Claim 13, Line 38:
"method according claim 12, wherein" should read: -- method according to claim 12, wherein --.

Signed and Sealed this
Eighth Day of July, 2025

Coke Morgan Stewart
*Acting Director of the United States Patent and Trademark Office*